No. 733,134. PATENTED JULY 7, 1903.
W. BREMER.
TILES FOR CEILINGS.
APPLICATION FILED FEB. 15, 1902.
NO MODEL. 4 SHEETS—SHEET 1.

Witnesses:
M. C. Lyddane.
Mary F. Roy

Inventor.
Wilhelm Bremer.
by G. Dittman Atty.

No. 733,134. PATENTED JULY 7, 1903.
W. BREMER.
TILES FOR CEILINGS.
APPLICATION FILED FEB. 15, 1902.
NO MODEL. 4 SHEETS—SHEET 2.
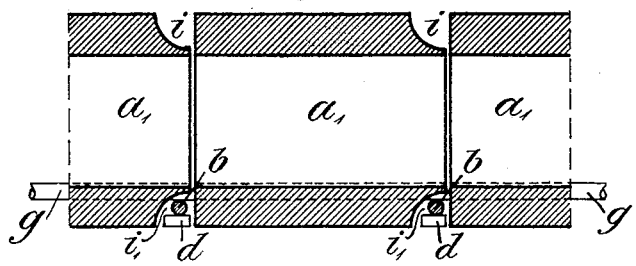
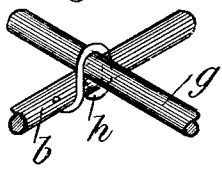 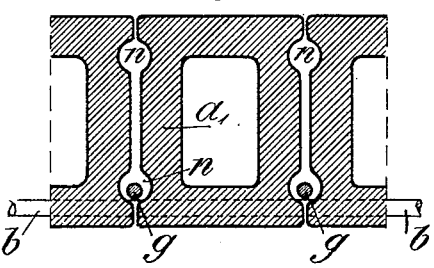 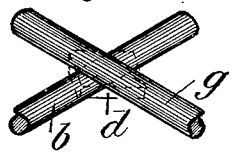
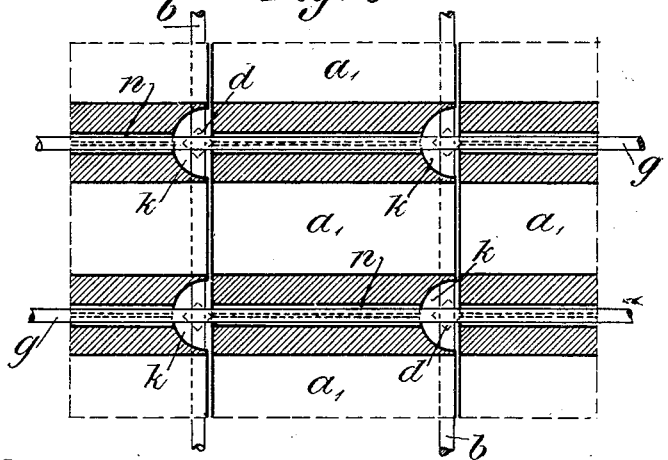 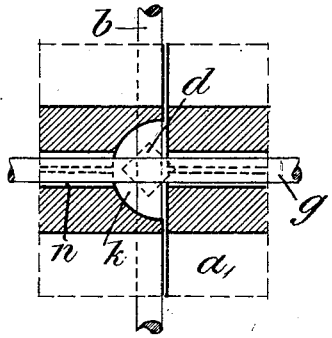
Witnesses:
W. C. Lyddans.
Mary F. Roy
Inventor.
Wilhelm Bremer.
by G. Dittman Atty.

No. 733,134. PATENTED JULY 7, 1903.
W. BREMER.
TILES FOR CEILINGS.
APPLICATION FILED FEB. 15, 1902.
NO MODEL. 4 SHEETS—SHEET 4.

Witnesses:

Inventor.
Wilhelm Bremer.
by G. Dittmar Atty.

No. 733,134. Patented July 7, 1903.

UNITED STATES PATENT OFFICE.

WILHELM BREMER, OF EMDEN, NEAR ERXLEBEN, GERMANY.

TILES FOR CEILINGS.

SPECIFICATION forming part of Letters Patent No. 733,134, dated July 7, 1903.

Application filed February 15, 1902. Serial No. 94,257. (No model.)

*To all whom it may concern:*

Be it known that I, WILHELM BREMER, a subject of the Emperor of Germany, residing in Emden, near Erxleben, Germany, have invented certain new and useful Improvements in Tiles for Ceilings, of which the following is a specification.

The present invention relates to bricks or tiles used for ceilings, which offers the advantage that ceilings of great stability and carrying power can be made without the use of iron girders. The tile or brick is preferably hollow and by its peculiar shape permits of embodying iron wire, which will be hereinafter more fully described.

Figure 1:
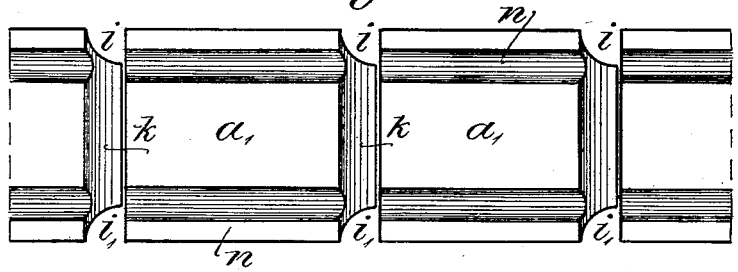
Figure 2:
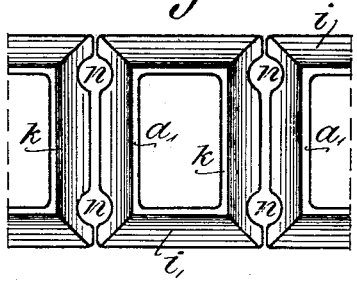
Figure 3:
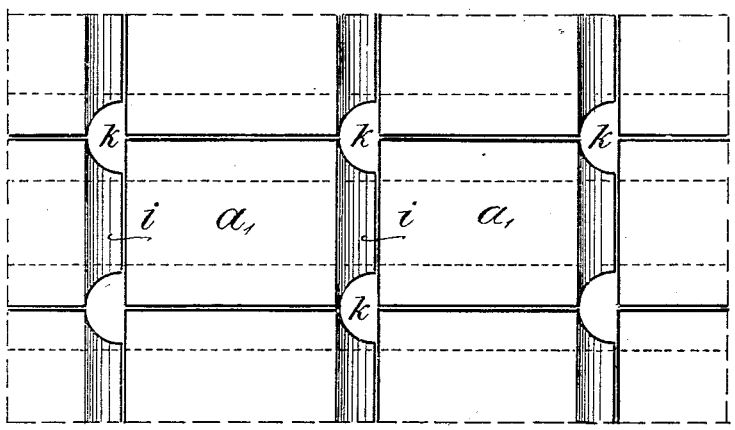
Figure 10:
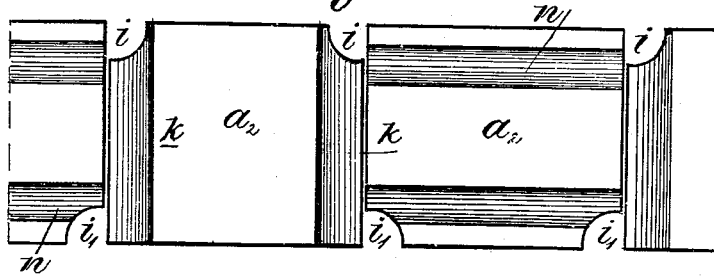
Figure 11:
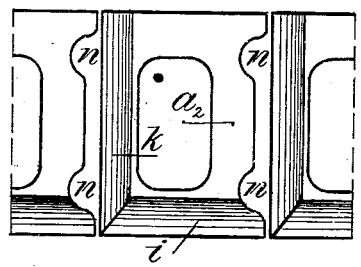
Figure 12:
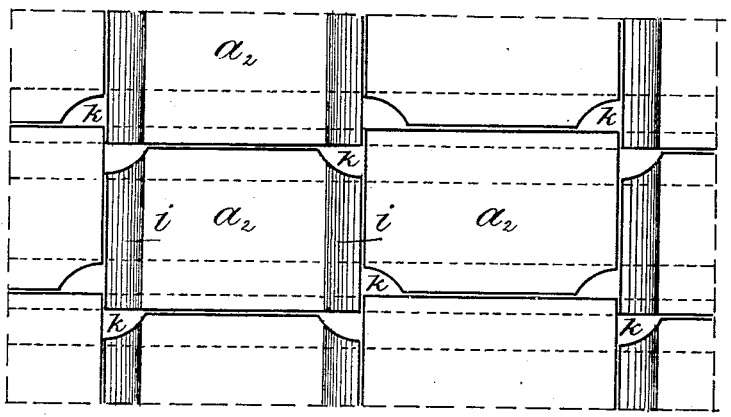
Figure 13:
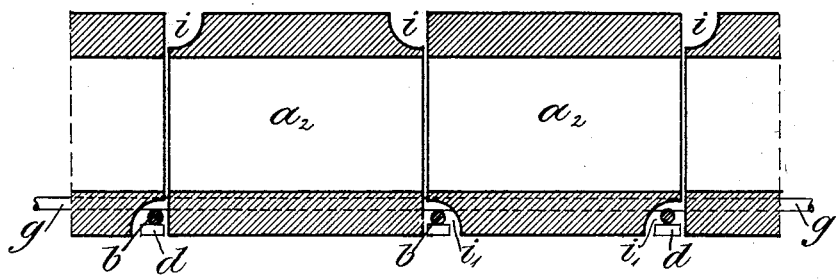
Figure 14:
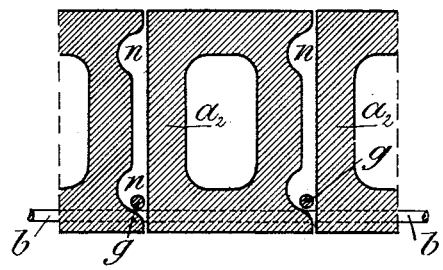
Figure 15:
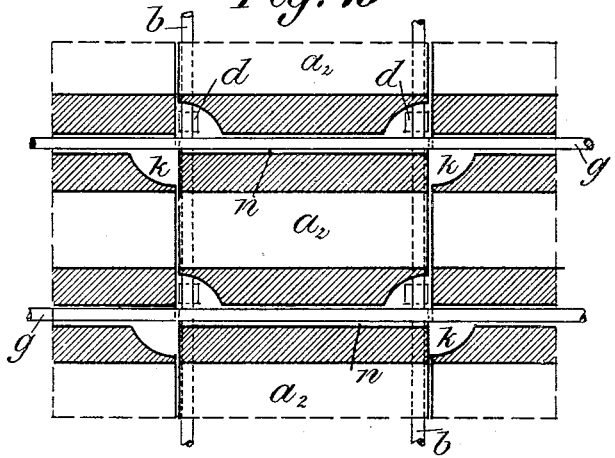
Figure 16:
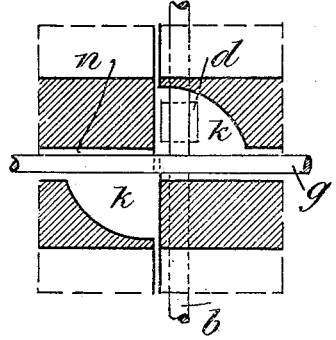

In the accompanying drawings, Figure 1 shows a new shape in tiles in side elevation. Fig. 2 indicates in end elevation part of a row of tiles. Fig. 3 is a plan view of a number of tiles in place. Fig. 4 is a longitudinal section. Figs. 5 to 9 illustrate the arrangement and combination of the tiles with the iron wire. Figs. 10, 11, 12, and 13 show a modification in the shape of the tiles in view similar to Figs. 1, 2, 3, and 4. Figs. 14, 15, and 16 show the arrangement and combination with the iron carrying-rods of this modified form of tile.

The tiles represented by Figs. 1 to 9 are rectangular blocks $a'$, which can be solid, but are preferably made hollow. The four edges at one end are beveled off, the bevel being preferably curved, as shown at $i$ $i'$ in the drawings. Two opposite side faces are provided with longitudinal grooves $n$, one near the upper edge and the other near the lower edge, as shown.

Tiles of the correct shape are placed in rows in such a manner that the beveled ends of one row are binding against the unbeveled ends of the preceding row. In this way longitudinal or transversal grooves along the bevels $i$ and $i'$ may be formed in the ceiling, and open channels $k$ will extend across the thickness of the ceiling at every point where the tiles are joined.

In using the tiles I proceed in the following manner: The carrying-wires $b$ are tightly stretched from wall to wall across the space over which the ceiling is to be made. Then I run parallel to one side wall a wire $g$ across wire $b$ and at such a distance from the wall that the tiles can be squeezed between the wall and the wire $g$, which rests into the lower lateral groove of the tiles. Thereby the tiles are laid in the order shown in Figs. 1, 3, and 4—that is, the beveled end of each succeeding one is touching the unbeveled end of the preceding tile. While the first row is completed in the described manner the lower beveled front edge of each tile finds a support on the respective wire $b$. In placing the second row of tiles along the wall I proceed in the same manner. I stretch a second wire $g$ crosswise over all the wires $b$ at such a distance from the first row of tiles that I can squeeze the tiles in between the first row and wire $g$, which is lodged into the lower longitudinal grooves $n$ of the tiles. I continue in the same manner with the third and fourth and the following rows until the whole space of the room is covered. I preferably use small wire staples $h$, as shown in Fig. 5, to connect the wires $b$ and $g$ at the points where they cross each other. I also make use of small plates $d$, used under the wires $b$. These plates, as well as the staples, can be suspended in any suitable manner from the ceiling-joists, if such are used. If no supporting-joists are used, the wire-netting alone is the principal carrier of the tiles, and then the staples $h$ are employed. Having thus brought all the tiles into place, mortar (preferably cement mortar) is used to fill out the grooves $i$ and $i'$ and channels $k$. The latter are of service in allowing the mortar to be employed from the top by letting the same descend and enter into the grooves $n$, which form between the rows of tiles longitudinal channels, as shown in Figs. 2 and 7. When the cement mortar has hardened, the boarding, which may be employed to receive the ceiling, can be safely taken out; but such boarding may be entirely dispensed with when proceeding in the above-described manner. It is obvious that in this way a ceiling can be obtained perfectly smooth at the upper as well as at the lower surfaces, the strain on the lower surface being taken up by the wire-netting, while the pressure on the upper surface is taken up by the material of the tiles and the mortar, which in filling out all the joints prevents the cracking of the corners of the individual tiles.

The modification in the form of the tiles Figs. 10 to 16 consists in beveled blocks or tiles $a^2$ at both ends, but only at two meeting edges. The longitudinal grooves $n$ are the same as in the tiles Figs. 1 to 9. In placing these tiles the succeeding tiles are turned in a certain way for one hundred and eighty degrees in the manner illustrated by Figs. 10 to 13. In considering the middle row of the plan view Fig. 12 the tile at the left side shows one bevel $k$ running crosswise through the ceiling. The adjacent bevel at the same end of this tile is at the lower edge, and of course it is not shown in this figure. The next tile $a^2$ is turned for one hundred and eighty degrees around its longitudinal axis and also for one hundred and eighty degrees around its transversal axis, so that the left-hand bevels show in the drawings, the horizontal bevel being near the top surface and the adjacent vertical bevel crossing the thickness of the ceiling. The opposite end of this tile has the same position. The following tile is again turned for one hundred and eighty degrees around both the longitudinal and the transversal axes, and the bevels form transverse channels $k$, the same as the tile to the left of Fig. 12, and the bevels in the horizontal plane are not shown.

Having thus fully described my invention, what I claim as new, and desire to secure by Letters Patent of the United States, is—

1. Tiles for ceilings or floors provided with beveled end edges and grooved side faces, the grooves and beveled edges being adjacent to and at right angles with each other, substantially as and for the purposes set forth.

2. Tiles for ceilings or floors provided with beveled end edges and grooved side faces, the grooved and beveled edges being adjacent to and at right angles with each other in combination with a wire-netting consisting of crossed wires laid in the bevels and grooves, substantially as described.

3. Tiles for ceilings or floors provided with transversely-beveled end edges and longitudinally-grooved sides, the bevels and grooves being adjacent to and at right angles with each other, substantially as and for the purposes set forth.

4. Tiles for ceilings or floors provided with transversely-beveled end edges and longitudinally-grooved sides, the bevels and grooves being adjacent to and at right angles with each other in combination with longitudinal wires embedded in the grooves, and transverse wires embedded in the bevels, substantially as set forth.

5. Tiles or bricks for ceilings or floors, having at one end all the edges beveled and having in two opposite side faces lateral grooves parallel to the longitudinal axis of the tiles, each of these side faces presenting one of these grooves near the upper edge and the other near the lower edge substantially as described and for the purposes set forth.

6. Tiles or bricks for ceilings or floors, having at one end all the edges beveled and having in two opposite side faces lateral grooves parallel to the longitudinal axis of the tiles, each of the side faces presenting one of these grooves near the upper edge and the other near the lower edge, in combination with a wire-netting formed of parallel wires $b$ to be embedded in the bevels at the lower edge, and parallel wires $g$ crossing the wires $b$, to be embedded into the lower longitudinal grooves, substantially as described and for the purposes set forth.

In testimony whereof I have affixed my signature.

WILHELM BREMER.

In presence of—
EDUARD CLAUDE,
RUDOLPH FRICKE.